Aug. 24, 1954
A. W. RAFFERTY
2,687,144
VALVE APPARATUS FOR CONTROLLING
PRESSURE IN FLUID CONDUITS
Filed Aug. 8, 1949
2 Sheets-Sheet 1
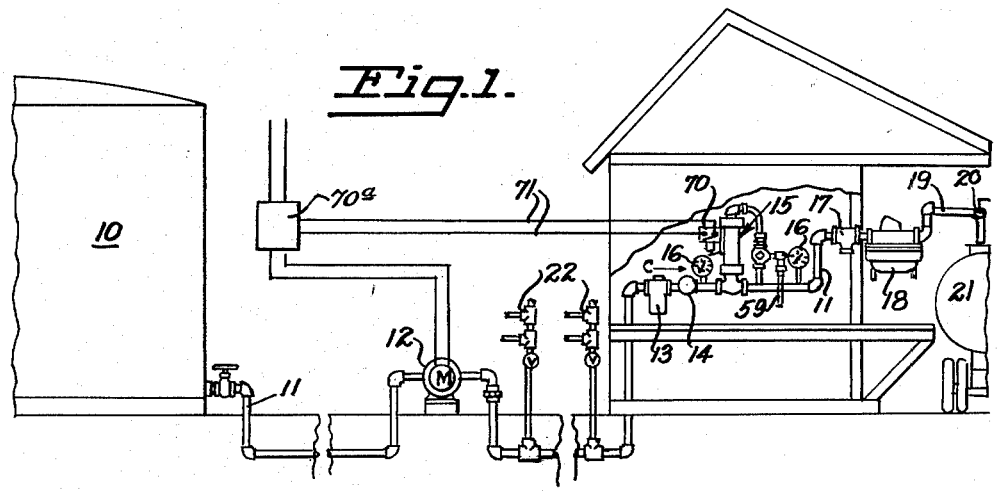
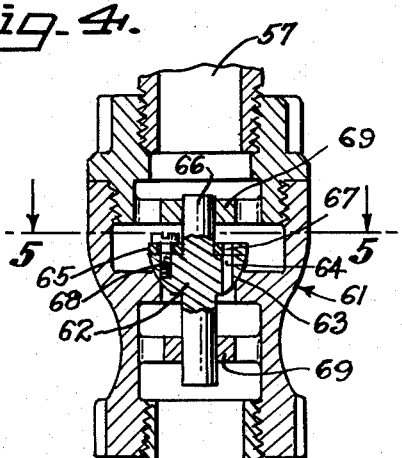
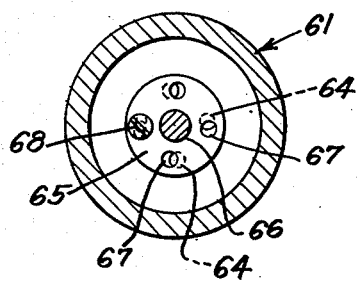
INVENTOR.
ARTHUR W. RAFFERTY
BY
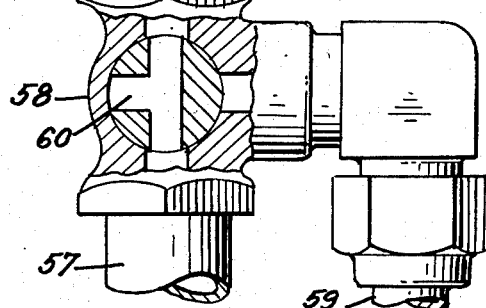
ATTORNEY Aug. 24, 1954

A. W. RAFFERTY 2,687,144

VALVE APPARATUS FOR CONTROLLING
PRESSURE IN FLUID CONDUITS

Filed Aug. 8, 1949

INVENTOR.
ARTHUR W. RAFFERTY
BY

ATTORNEY

Patented Aug. 24, 1954

2,687,144

UNITED STATES PATENT OFFICE 2,687,144

VALVE APPARATUS FOR CONTROLLING PRESSURE IN FLUID CONDUITS

Arthur W. Rafferty, Sacramento, Calif.

Application August 8, 1949, Serial No. 109,176

4 Claims. (Cl. 137—565)

This invention relates to regulation and control valves for fluid lines for controlling and regulating pressure and rate of flow of the fluid. The invention has particularly advantageous uses in fluid lines wherein fluid under pressure is to be metered in transit, though such a relationship is not a limitation of the uses and advantages of the structure of the invention.

Substantially all valuable commercial fluid in transit in conduit pipes is metered, such as oil and its products, gases, chemicals and the like, or even water in city supply systems.

A suitable example with relation to which the invention may be described in one exemplification is the filling of railroad tank cars or tank trucks with liquid petroleum products.

Such transport vehicles are usually filled from elevated platforms and the liquid product is measured through intricate, sensitive and costly liquid meters of various types. The fluid is pumped from remote storage tanks, or may flow from elevated storage tanks, through large conduits to a loading platform. To facilitate rapid operation, the volume rate of flow and the conduit pipes are relatively large, and pumps, where employed, should have very great power. Thus a large volume of fluid is pumped at a high velocity. Starting or stopping of the pumps, or sudden opening or closing of an outlet of the conduit system, causes a surge of the liquid in the conduit, the velocity and volume of which causes hydraulic impact or hydraulic hammer on the pumps and the delicate mechanism of a meter.

It is the principal purpose of the present invention to control and regulate this hydraulic hammer on the pumps and meter. It is to be understood, however, that the control valve of the invention may also be employed to regulate rate of flow and velocity in conduit lines which do not include a meter.

Broadly, the novelty of the invention consists in providing a valve control means responsive to pressure of fluid flow, and more particularly the specific means comprises a cylinder and a piston therein, the piston having a depending shaft suitably packed and extending into a valve chamber which is in the fluid conduit or conveyor line, a lift type control valve, such as a gate or cone, being mounted on the end of the shaft within the valve chamber and subject to opening and closing responsive to reciprocal movement of the piston in the cylinder, the piston being spring loaded upwardly in the cylinder to a predetermined tension formula. In the main conveyor conduit adjacently beyond the control valve, in direction of fluid flow, is a take-off pressure tube communicating with the fluid conduit line and the cylinder pressure chamber above the piston, so that the pressure in the conduit line is transmitted to the pressure chamber of the cylinder and reacts on the piston to depress it against the tension of the spring proportionately to the pressure in the conduit line, whereby the pressure in the conduit line tends to depress the piston and close the control valve against the upward expansion of the spring which latter by its expansion, tends to open the control valve to its maximum extent. Suitable accessorial facilities are also included in the structure of the invention, such as a means to adjust the seating of the control valve, a restrictive check valve in the take-off tube, and a switch operative by the piston for starting and stopping operation of a pump in the supply line under approximate circumstances.

To more fully explain the invention, reference is made to the accompanying drawings illustrative of one form of embodiment of the invention, and in which:

Fig. 1 is a front elevation of a diagrammatic view or flow sheet illustrative of the loading assembly for fluid petroleum products, showing the environment of utilization of the invention.

Fig. 4 is an enlarged vertical centrally transverse section in detail of a portion of the structure of Fig. 3.

Fig. 5 is a horizontal transverse section on line 5—5 of Fig. 4.

Figure 2:
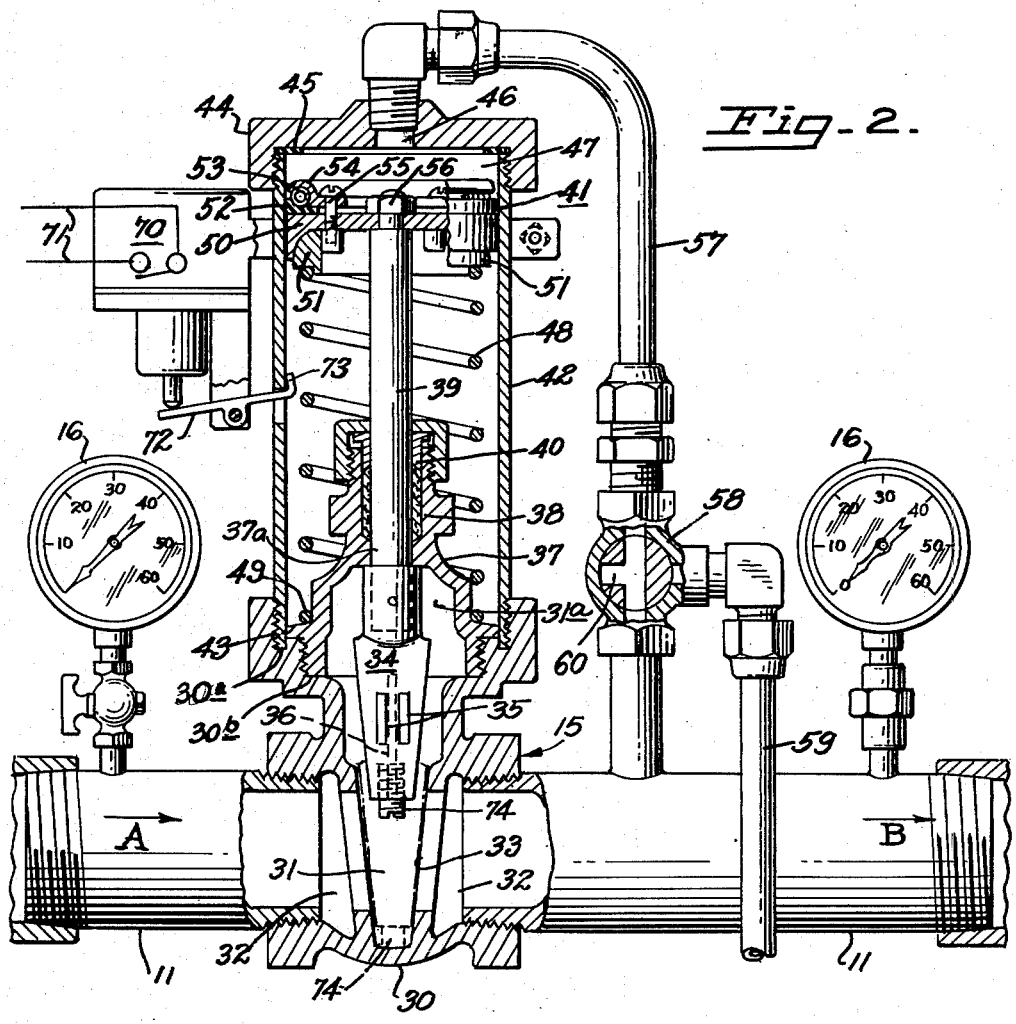
Fig. 2 is an enlarged side elevation of the cylinder, piston and valve structure of the invention, partly in central transverse vertical section.
Figure 3:
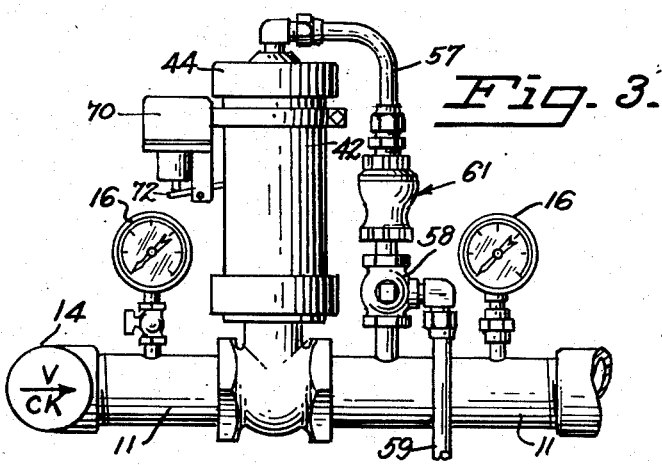
Fig. 3 is a front elevation of a modified portion of the invention.

Referring to the drawings in which like reference characters indicate corresponding operational parts in the several views, and referring first to the flow sheet of Fig. 1 to illustrate an environment of the invention, a storage tank for an accumulated supply of fluid is indicated 10, and 11 is main supply or conveyor conduit line, 12 is a pressure source to create flow, and may be gravity, but as here exemplified, is a motor driven pump for causing the fluid to flow under pressure in the main conveyor conduit or supply conduit, 13 is a strainer for the fluid, 14 is a one-way swing check valve the direction of opening being indicated by arrow C; the control and regulating valve structure of the present invention is generally indicated 15, and 16 indicates sight pressure gauges in the conduit line on the inflow and discharge sides of the control valve; 17 is a cut-off valve which is usually closely adjacent a suitable liquid discharge meter 18 which meters the discharge from the conduit. A pivotally swingable tubular loading arm is indicated 19 having adjacent its discharge end a manually operable outlet discharge or loading valve 20, the transport tank to be filled being indicated 21 in its entirety. Conduits to other outlets of the conveyor line are indicated 22, of which there may be any suitable number comparable to the capacity of the pump and conveyor conduit line 11.

In loading a transport vehicle it is practice for the loading operator to start the pumps, of which there are one or more, in the line between the storage tank and loading outlet, which is usually accomplished by a suitable remote control electric switch (not shown). When the meter 18 is not operating by flow of fluid, it is customary to maintain the meter block valve 17 closed, so that opening and closing of other outlets communicating with the same main conveyor conduit will not cause repeated shock of hydraulic stress or hammer on the meter. Therefore, when metering discharged liquid, if the meter block valve is closed it is opened by the operator and connection is made to the transport tank by means of the tubular loading arm 19, whereupon the discharge outlet or loading control valve 20 is manually operated, the tank filled and the meter reading noted. Incidentally, proper temperature readings may also be made in the transport vehicle for use in accounting procedure due to expansion and contraction of volatile liquids.

Due to these various steps which must be accomplished, there is a considerable period during the loading process when the meter is inoperative, but open to the full pressure from the pump, which is usually as high as practical to facilitate the handling of products as rapidly as possible when all or a large part of the loading facilities of all communicating conduits are in use. As there are usually several and sometimes many discharge outlets to a single fluid supply line, it follows that to supply adequate pressure when all outlets are in use, the line pressure, when less than the full number of outlets are in use, will be greater than is desired for safety when only a small portion of the outlets and meters are in operation. During the inoperative period of the meter it frequently occurs that other loading valves of other unloading lines 22 fed by the same main supply line, are closed quickly and the hydraulic hammer produced by the sudden stoppage and momentary reversal of flow will cause great damage to the delicate mechanism of the meter. While the meter parts are in a static condition, they are unable to overcome the inertia and start quickly enough to safely handle the sudden and violent impact described. Not only are the working parts frequently broken, but the main housing or casings are sometimes burst. In long lines the great weight of rapidly moving fluid sometimes exerts enough force to burst the housing of the pumps themselves due to the extreme pressure momentarily exerted when the flow from tank to pump is suddenly stopped, since in the petroleum products plant, or other plants of large capacity, the length and size of fluid lines as normally used contain many barrels of fluid moving at high velocity and the destructive force of resultant hydraulic hammer is very great. When damaged, the repair of a large fluid meter or a pump is costly and it may be inoperative for a considerable period, thereby reducing the output of the plant.

In normal loading operations, as a tank approaches the full mark, it is usual for the loading operator to greatly reduce the flow by manipulating loading valve 20, in order to better gauge accuracy of load. This causes the meter to operate at low volume at top pressure, resulting in internal slippage of the fluid or inaccurate delivery, which is an undesirable condition in the handling of valuable fluids such as petroleum products.

A main feature of the present invention is that the control valve of the regulating assembly 15 remains closed while the meter is inoperative and the pump is operative, thereby protecting the meter and other devices in the line against the effect of hydraulic hammer produced by fluctuations of pressure in other communicating portions of the same line. While in use the movable parts of meter 18 are revolving or operating rapidly and are not affected by hydraulic shock. The pressure of the line itself is made to control, as desired, the pressure reaching the inlet side of the meter or other device to be protected.

In the present device the control valve is normally closed when the pump is running and the meter is not in use, because the hydraulic pressure is translated to a piston to close the valve. When an outlet or loading valve is open, pressure on the delivery or discharge side of the regulation valve drops and the piston-and-valve-assembly rises proportionately to the decreased liquid pressure and permits the passage of fluid at a constant pressure, predetermined by the compression value of the spring in the cylinder acting against fluid pressure above the piston. When the outlet flow is reduced, pressure on the delivery or discharge side of the valve tends to rise toward line pressure thereby causing the piston to depress and maintain a constant pressure on the delivery or discharge side of the valve. When the outlet loading valve is entirely closed, the gate of the regulating valve being in hydraulic step will close in unison and remain closed until outlet discharge loading is resumed, thereby protecting the meter against hydraulic shock while inoperative.

Some plants deliver on gravity pressure when storage is at a high level and only part of the loading facilities are in use. Under such conditions there is not always enough pressure in the line to close or partly close the regulating valve while the meter is not operating, but this is immaterial as there is, under this condition, no possibility of damage from hydraulic shock. This failure to close while the pressure pump is not in use permits normal operation as a gravity system and eliminates any necessity of by-pass manifolds such as are required when regulation is accomplished by diaphragm devices. At any time the pump should be started, all valves in the line will close automatically proportional to the increased pressure if the meter is not in use; and if the meter is in use, the regulating valve will control pressure to a predetermined value.

Referring in detail to Fig. 2 and the main line supply conduit 11, the arrows A and B indicate direction of fluid flow, A being the upstream inlet side and B the downstream discharge side side of the regulating valve structure. A valve housing 30 is tightly connected in the main conduit conveyor or supply line between confronting ends of sections of supply pipe or conveyor conduit 11. The valve may be of any suitable type of lift valve assembly having a chamber 31 communicating at its opposite ends with the supply conduit as at 32, and being provided therein with a seat and a valve plug adapted to open and close the supply conduit through the valve chamber. As exemplified herein, a standard gate valve is employed in which a seat, preferably of the tapered type, is indicated 33 and the gate plug 34, the latter being tapered at its side faces complementally to the seat and provided with relatively spaced lugs 35 which are slidably guided by a vertical guide track 36 at opposite faces of the interior of the valve chamber. A gate type lift valve is preferred because it is relatively thin in the nature of a blade and in operation it cuts transversely across the stream of liquid flow. The body of the valve housing extends outwardly from the valve chamber and provides a pair of radially spaced annular seats, the outer one 30a seating a cylinder and the inner one 30b seating a closure wall by which the valve chamber is elongated upwardly from its valve seat to provide an ancilliary chamber 31a into which the gate valve plug may reciprocate from its seat. The top of the ancillary chamber is closed by a header closure wall 37 which, however, has a guide opening 37a therethrough and also provides a stuffing box socket 38, a valve stem piston rod 39 being reciprocable through the guide opening and packing gland seal 40 in the stuffing box.

At its end within the valve chamber the valve stem mounts the gate valve plug 34 and at its opposite end beyond the valve chamber it mounts a piston generally indicated 41 to be further described.

A tubular cylinder 42 is tightly mounted on the outer annular seat 30a of the valve casing, as by threaded connection 43, and extends upwardly preferably with its axis perpendicular to the axis of the supply conduit and valve seat, being tightly closed at its opposite upper end by a head 44 including sealing gasket 45. The cylinder head has an opening 46 the purpose of which will be further set forth.

The cylinder at its lower end houses in coaxial relation the upwardly extended ancillary portion 31a of the valve chamber casting and the packing gland or stuffing box 38 through which is guided the reciprocation of the valve stem rod 39. At its upper end the cylinder houses the piston 41 providing a liquid pressure chamber 47 between the piston and the cylinder head 44, the valve stem being of suitable length to dispose the piston closely adjacent to the cylinder head when the valve is completely and fully opened. The cylinder chamber below the piston head may be termed a secondary chamber of the cylinder.

The piston is urged upwardly toward the pressure chamber and towards the cylinder head by a coilspring 48 of a predetermined tension-compression capacity, the spring being mounted in the secondary chamber of the cylinder and footed on the valve chamber housing at 49 and having its opposite end bearing against the underside of the piston 41, the auxiliary valve chamber 31a and the packing gland stuffing box 38 extending into and being surrounded by the coil spring whereby they overlap in length and the base of the spring is centered by the closure wall of the auxiliary chamber and the length of the apparatus is minimized.

The piston 41 at the head of the valve stem may be of any suitable efficient piston type slidably sealing against the wall of the cylinder and therefore may be very briefly described as comprising a skirted circular head plate 50 having at its underside an annular ring 51 against which the upper end of the spring 48 bears. A piston sealing gasket 52, preferably leather, overlies in facial contact the skirted plate, and has its circumferential sealing lip maintained in slidable contact with the cylinder by an annular coil spring 53, the radially outward tension of which is maintained by a spreader plate 54 which is flanged at its circumference to fit within the annular coil spring, the several plates of the piston being secured in clamping relation on the gasket and spring by screws 55 and the piston assembly being secured at the end of the valve stem by thread and nut 56.

At the outlet or downstream side of the regulating valve chamber, that is, beyond the valve chamber in direction of fluid flow, a fluid pressure take-off tube 57 has one end communicating with the main supply line 11 and its opposite end communicating with the opening 46 in the cylinder head and into the pressure chamber of the cylinder. The opposite chamber of the cylinder, or that portion housing spring 48, below the piston, is free of communication with the pressure in the main conveyor conduit, for the reason that such communication would tend to balance the fluid pressures on opposite sides of the piston.

Intermediate the ends of the take-off tube 57 is a means for interrupting communication through the tube, comprising a simple three-way, three-port cock valve 58. This valve, when its main passageway port is open in the line of take-off tube 57, permits the pressure in the main supply conduit to be transmitted to the pressure chamber and the piston in the cylinder and depress the piston against the tension of spring 48, since the area of liquid pressure on the blade-like gate valve does not substantially affect the liquid pressure on the relatively larger area of the piston. If it is desired to eliminate the regulation valve in the conveyor conduit from operation, this three-way valve may be closed with relation to the take-off tube, which permits the spring loaded piston to rise, if it is depressed, and under such circumstances, any liquid confined in the pressure chamber may be drawn into a wasting pipe 59 by rotating the valve 58 ninety degrees from position shown in Fig. 2 and thereby placing a lateral port 60 in communication with the take-off tube 57. Thus the main conveyor conduit 11 may be in full use without regulation when the lift valve 31 is raised and the communication through the take-off tube is eliminated. Such elimination of operation of the valve in the main conveyor may at times ve very useful in repair or adjustment of the operating parts within the cylinder portion 42, or in the event of an emergency loading when it is desired to pump large quantities of fluid through the system in the shortest possible time without any regulation of flow. These emergencies do happen, though not to be desired, and it is to be observed that provision has been made therefor. Elimination of operation of the regulating valve may also frequently be a very important factor in installations where the direction of flow in the conveyor conduit may selectively be in either direction, such for example, as in tanker ship operation, which may involve either loading or unloading a ship hold. In such an operation it may be either a meter or a flexible hose which is to be protected from excessive pressure or hydraulic shock. Since the direction of flow of liquid might be in either direction, it would be normal to provide the regulating valve assembly of the invention adjacent each opposite end of the conveyor conduit or hose, the respective regulating valve assemblies being employed or operated, depending upon the direction flow of the fluid. In such instance it would be desirable that one only of the valve assemblies should be operative at a time, and this may be accomplished by closing the cock valve 58 of the take-off tube of the other valve assembly.

Means are optionally provided whereby the response of the regulating valve of the conveyor conduit may be more instantly responsive to sudden or rapid closing of the discharge outlet than to the opening of a discharge outlet, since the sudden closing of a discharge outlet causes hydraulic shock to a meter or hose, and when a discharge outlet is opened it is highly preferable that a dormant meter be motivated slowly, or, even though there is no intervening meter, that pressure in a hose shall be brought slowly to maximum internal pressure. Such a means herein comprises a novel restrictive by-pass check valve structure having a tubular valve body or hosing generally indicated 61 preferably installed in the pressure take-off tube 57, between the three-way cock valve 58 and the pressure chamber 47. Within the tubular valve housing is mounted a check valve plunger 62, preferably tapered to seat at its lower face on a valve seat 63, the valve plunger body having its opposite or upper face planar perpendicularly to the axis of the valve housing. Through the body of the valve plunger member are provided orifices 64 affording communication between said opposite faces of the plunger. Rotatably slidable upon the planar face of the valve plunger is mounted a restrictive by-pass plate 65 rotatable upon a valve guide stem 66 which is reciprocably mounted in and guided by perforated transverse webs 69 in the tubular body. The planar plate 65 is provided with openings 67 adapted to register with the orifices 64 of the valve plunger, the extent of such register being adjustable by rotation of the planar plate upon stem 66 and appropriately fixing the plate at an adjusted position of register by set screw 68 by which the plate is rotatably secured upon the planar face of the valve plunger. The relatively large area of the perforations in the web 69 and at the check valve seat 63 as compared with the orifices and openings 64, 67, through the plunger and plate, permits a relatively free rapid flow of fluid to the pressure chamber 47 in order that the regulating valve 31 may be instantly responsive to pressure of fluid flow in the conveyor conduit and remain in balanced hydraulic step with fluctuations of pressure therein due to closing of outlets such as the discharge outlet 20 and thus avoid shock to the entire system should any discharge outlet be closed too rapidly. On the other hand, it is advisable to start a dormant inoperative meter, or put pressure on an inactive hose or conduit relatively slowly. Since the regulating valve opens responsive to release of pressure in the pressure chamber, it is advisable that the pressure be released slowly, which is accomplished by the adjustably restrictive orifices 64 permitting only a restricted quantity of flow to flow through the plate and valve openings 64, 67.

Optionally also when desired, a simple wellknown standard explosion-proof electric control switch 70 may be mounted adjacently exterior of the cylinder wall by bracket as shown in Fig. 2 to start and stop the pump motor automatically by remote control of the usual magnetic motor control mechanism, connected electrically as by conduits 71 to the pump motor 12. The switch is operated by movement of piston 41 engaging a pivoted switch lever 72 one end of which extends through an opening in the cylinder wall as at 73 for contact by the piston skirt upon depression of the piston, the opening also providing a vent for the secondary chamber of the cylinder below the piston. This switch is constructed so that when the piston is at depressed position responsive to pressure confined in the cylinder the switch is open and breaks the circuit of the motor so that pumping of liquid ceases.

The previously mentioned swing check valve 14 (as indicated in Fig. 1) maintains the pumppressure of the system on the piston 41 while there is no discharge outflow and the meter is inoperative, even though the pressure in the main conveyor conduit is static. When a discharge opening or loading valve is opened, the pressure on the piston 41 is decreased and the piston rises, releasing end 73 of the switch lever and permitting the switch to close and start the pump motor by remote magnetic control through switch 70a which would be capable of handling a higher voltage for pump power. Upon closing the discharge outlet valve 20 pressure is again exerted on the piston which is thereby depressed and opens the switch 70, thereby stopping the pump motor. This novel control has many valuable features. It saves power cost by permitting the motor to run only when an outlet or loading valve is open. It provides against failure of personnel to stop the motor on conclusion of the delivery. As pumps are usually out of sight and hearing of the loading operators, this failure is of frequent occurrence, many times causing extensive damage by overheating of pumps at a time when no fluid is flowing in transit which flow normally cools the pumps. Another novel feature of the incorporation of the switch 70 is the fact that when several loading operations are in progress from the same line, the first loader to finish loading cannot, as now, stop the motor, thereby making it necessary for other loaders to restart the motor, assuming, of course that there is similar mechanism at each discharge outlet. With this switch device, opening any discharge outlet of the system or any discharge loading valve in the presently exemplified system, will start the pump which will then run until the last discharge opening has been closed. This feature of hydraulic electric control makes for saving in power cost, saving of time, and eliminates idling time and overheating of equipment.

Another valuable feature of the regulating control valve is the fact that it controls delivery pressures without adjustment which precludes unauthorized tempering by inexperienced or unauthorized persons. The desired pressure will be selected by the engineer ordering the equipment. Should future plant alterations make a change of pressure desirable, this may be easily accomplished by replacing the spring by one of suitable compression value.

For purposes of finely and accurately seating the gate valve, or other lift valve, an adjustable regulating screw 74 may be tapped into the seating end of the valve gate, to contact the floor of the valve chamber when the valve is seated as desired. In controlling flow of liquids the adjustment screw 74 would be set to permit sufficient leakage of flow through the gate valve to maintain pump pressure between the discharge outlet and swing check valve 14, but this is only desirable when the electric starting and stopping switch 70 is employed.

Having described the invention, what is claimed as new and patentable is:

1. In a fluid conveying system having a main conveyor conduit provided with a discharge outlet and an electrically activated pressure source for flowing fluid through the conveyor conduit and a fluid discharge meter relatively spaced in the line of fluid flow between the pressure source and discharge outlet, the improvement comprising a flow regulating valve assembly in the conveyor conduit in the line of fluid flow between the pressure source and the discharge meter comprising a valve chamber in the conveyor conduit, a valve member in the valve chamber adapted for opening and closing the conduit through the valve chamber, means operable for opening the valve, and a pressure take-off tube communicating with the conduit in the line of fluid flow between the pressure source and the discharge meter for closing the valve responsive to fluid pressure in the conveyor conduit, said regulating valve assembly including a switch operable by the valve assembly for making and breaking an electric circuit by which the pressure source is activated.

2. In a fluid conveying system including a main conveyor conduit having a discharge outlet, a power pump and a liquid discharge meter relatively spaced in the conveyor conduit and adapted, respectively, to pump and measure a flow of fluid through the conveyor conduit, the improvement comprising a flow regulating valve assembly in the conveyor conduit in the line of fluid flow between the pump and the discharge meter, said regulating valve assembly having means operable for opening the valve and means for closing the valve responsive to fluid pressure in the conveyor conduit in the line of fluid flow between the valve and the discharge meter, and including a restrictive two-way check valve having a greater freedom of flow towards the means for opening and closing the flow regulating valve and an adjustable more restricted flow in the opposite direction, and a switch operable by the regulating valve assembly for making and breaking an electric circuit by which the pump is operated.

3. In a fluid conveying system having a main conveyor conduit provided with a discharge outlet, an electrically activated pressure source for flowing fluid through the conveyor conduit, a flow regulating valve assembly in the conveyor conduit, comprising a valve chamber in the conveyor conduit, a lift valve member in the chamber adapted for opening and closing the conduit through the valve chamber, means operable for opening and closing the valve responsive to fluid pressure in the conveyor conduit including a pressure cylinder and a piston therein which is connected to the lift valve, and a restrictive two-way check valve having a greater freedom of flow towards the cylinder and piston and a more restricted flow in the opposite direction, and a switch operable by the reciprocation of the piston for making and breaking an electric circuit by which the pressure source is activated.

4. Means for controlling the flow of a fluid in a conveyor conduit, including a valve housing having a valve chamber connectible in communication in the line of fluid flow of the conveyor conduit, a flow controlled gate lift valve member in the valve chamber, said valve housing extending outward beyond the valve chamber and providing an inner and outer annular seat, a cylinder removably seated on the said outer seat, said valve housing having an elongated closure wall removably seated on said inner seat and extending coaxially into the cylinder providing an elongated ancillary chamber portion of the valve chamber into which the valve member may move, a piston reciprocable in the cylinder and having rod connection to said valve member whereby they move in unison, said cylinder having a pressure chamber on one side of the piston and a secondary chamber on the opposite side of the piston, a coil spring in said secondary chamber seated between said inner and outer seats whereby the coil spring seats circumferentially of the extended closure wall of the ancillary chamber portion of the valve housing, said spring having its opposite end tensioned against the piston for urging the piston towards the pressure chamber to open the valve, and a pressure take-off tube having communication at one of its ends with the pressure chamber of the cylinder and having its opposite end connectible in communication with the fluid conveyor conduit.

References Cited in the file of this patent

UNITED STATES PATENTS

| Number | Name | Date |
|---|---|---|
| 542,702 | Christensen | July 16, 1895 |
| 573,342 | Miller | Dec. 15, 1896 |
| 672,935 | Flint | Apr. 30, 1901 |
| 689,890 | Mull | Dec. 31, 1901 |
| 742,290 | Clark | Oct. 27, 1903 |
| 768,246 | Taylor | Aug. 23, 1904 |
| 894,102 | Banjock | July 21, 1908 |
| 926,787 | Virkler | July 6, 1909 |
| 952,410 | Bice | Mar. 15, 1910 |
| 987,080 | Rankin | Mar. 14, 1911 |
| 1,725,679 | Stein | Aug. 20, 1929 |
| 1,842,295 | Schurle | Jan. 19, 1932 |
| 1,913,557 | Miller | June 19, 1932 |
| 1,917,698 | Carson | July 11, 1933 |
| 2,074,950 | Wallace | Mar. 23, 1937 |
| 2,160,766 | Thomas | May 30, 1939 |
| 2,390,015 | Ulfsby et al. | Nov. 27, 1945 |
| 2,393,464 | Granberg | Jan. 22, 1946 |
| 2,426,364 | Massecar | Aug. 26, 1947 |

FOREIGN PATENTS

| Number | Country | Date |
|---|---|---|
| 287,737 | Great Britain | Mar. 29, 1928 |